(12) United States Patent
Shu (10) Patent No.: US 7,419,191 B2
(45) Date of Patent: Sep. 2, 2008

(54) QUICK INSERT NOZZLE FOR TOOLS

(76) Inventor: Wen-Chin Shu, No. 77, Lun Gang Lane, Xia Lun Village, Xiu Shui Township, Changhua Hsien (TW)

( * ) Notice: Subject to any disclaimer, the term of this patent is extended or adjusted under 35 U.S.C. 154(b) by 16 days.

(21) Appl. No.: 11/594,775

(22) Filed: Nov. 9, 2006

(65) Prior Publication Data
US 2008/0111370 A1 May 15, 2008

(51) Int. Cl.
*F16L 27/00* (2006.01)
(52) U.S. Cl. .......................... 285/276; 285/98
(58) Field of Classification Search ............. 285/276, 285/98
See application file for complete search history.

(56) References Cited
U.S. PATENT DOCUMENTS 2,384,360 A * 9/1945 Allen et al. ................ 285/98
2,531,021 A * 11/1950 Bard ......................... 285/276
3,290,068 A * 12/1966 Jackson ..................... 285/276
3,517,952 A * 6/1970 McCracken ................ 285/276

* cited by examiner

*Primary Examiner*—Aaron M Dunwoody
(74) *Attorney, Agent, or Firm*—Rabin & Berdo, P.C.

(57) ABSTRACT

A quick insert nozzle structure has a pipe connector connected to an insert nozzle. An end of the pipe connector has a containing groove for connecting a joint of a quick insert nozzle that has three circular grooves. An external circular groove installs a washer; a middle circular groove embeds balls, and an internal circular groove embeds a dust resisting cover. The balls match the joint for installing the balls and the washer. The wide groove diameter is coupled to the narrow groove diameter to form a guiding cambered surface, and the thickness of the wide groove diameter is reduced to form a thin covering plate. After the joint is installed, the thin covering plate is stamped to limit the balls, and a dust resisting cover is installed to complete assembling the quick insert nozzle. This invention not only makes the assembling process easy, but also prevents possible leaks.

3 Claims, 7 Drawing Sheets

QUICK INSERT NOZZLE FOR TOOLS

BACKGROUND OF THE INVENTION

1. Field of the Invention

The present invention relates to a quick insert nozzle for tools, and more particularly to a design for combining a pipe connector with a quick insert nozzle by using the pipe connector that corresponds to a containing groove at the joint of the quick insert nozzle and a groove of a thin covering plate, so that the pipe connector and the quick insert nozzle can be combined by a simple stamping process to overcome the shortcomings and complicated assembling operation of similar traditional products.

2. Description of the Related Art

Figure 1:
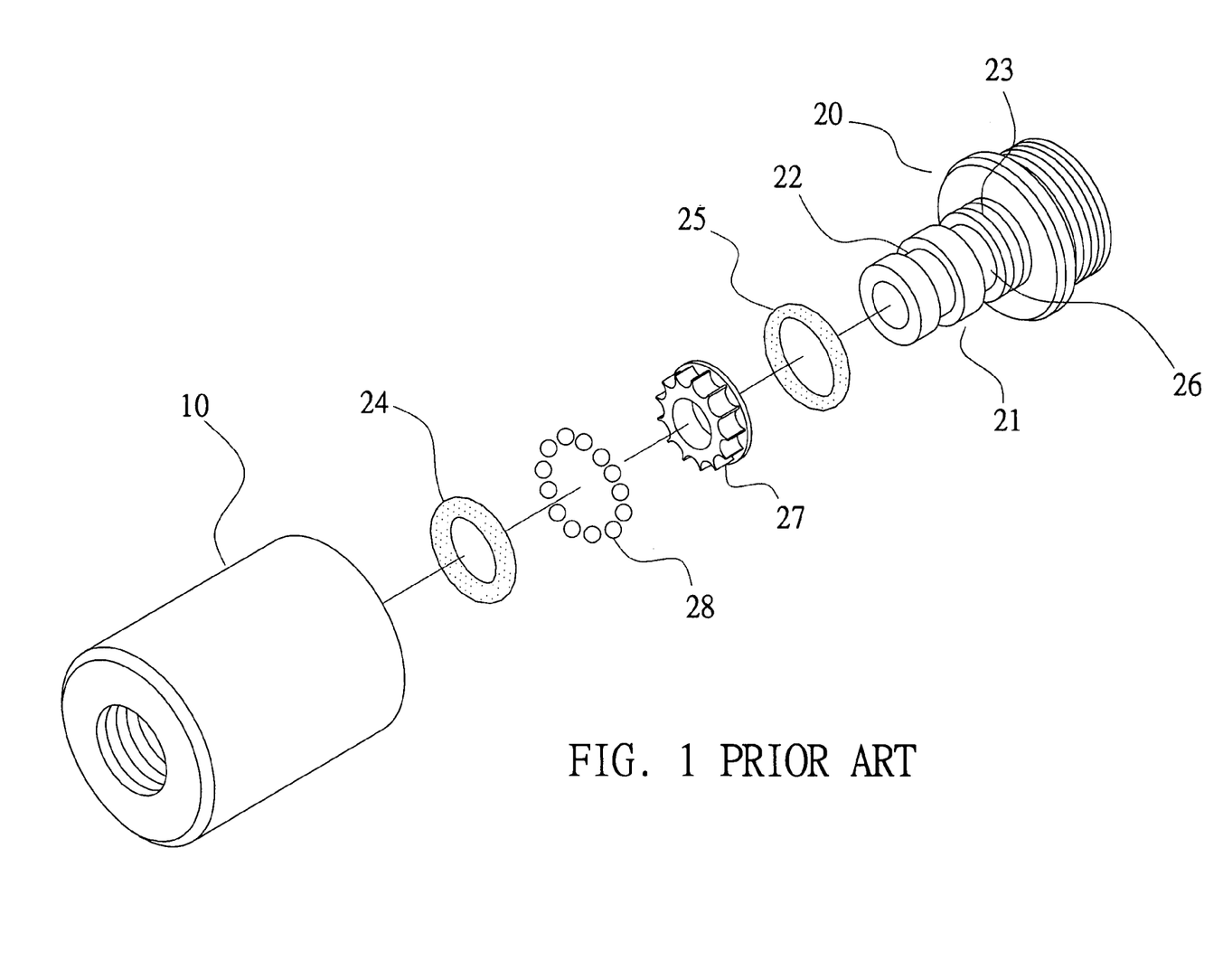
FIG. 1 is an exploded view of a traditional quick insert nozzle for tools.
Figure 2:
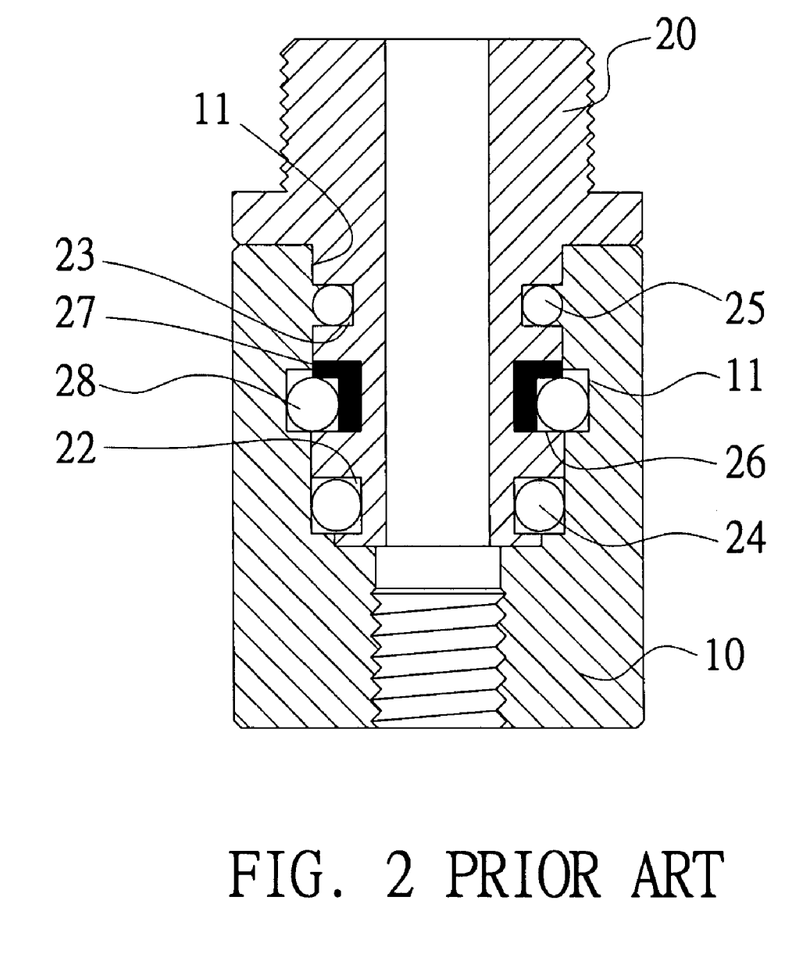
FIG. 2 is a schematic view of a traditional quick insert nozzle for tools.

Referring to FIGS. 1 and 2 for a structural design of a traditional quick insert nozzle for tools, the quick insert nozzle 20 includes a pipe connector 10 and a quick insert nozzle 20, and an end of the pipe connector 10 has a containing groove 11 for connecting a joint 21 of the quick insert nozzle 20, an embedding groove 12 disposed at a predetermined position of the internal periphery of the containing groove 11, circular grooves 22, 23 disposed respectively on both internal and external ends of the joint 21 of the quick insert nozzle 20 for embedding an O-ring 24, 25, an embedded circular groove 26 disposed at a middle section between the two O-rings 24, 25, a ball bearing 27 embedded in the embedded circular groove 26, and a plurality of balls 28 arranged in a circular shape and disposed in the ball bearing 27, such that when the joint 21 of the quick insert nozzle 20 is inserted into the containing groove 11 of the pipe connector 10, the balls 28 at the middle section can be embedded precisely into the embedding groove 12 of the containing groove 11, and the two O-rings 24, 25 maintains a close connection of the two. In this structure, the balls 28 are installed for achieving the effect of turning the quick insert nozzle 20 freely and facilitating the operation of the tools.

However, the structural design of these quick insert nozzles uses a ball bearing for containing the balls and provides sufficient compression on the balls, such that the joint of the quick insert nozzle can be inserted smoothly into the containing groove of the pipe connector to obtain a limit position of embedding the balls with the embedding groove of the pipe connector, so as to maintain the close connection, while the quick insert nozzle can be turned freely. However, when the quick insert nozzle is turned, the balls produce frictions with the internal wall of the embedding groove of the pipe connector, the balls will be worn out after a period of time, and a gap may occur between the balls and the embedding groove of the pipe connector. Furthermore, the ball bearing has provided sufficient moving space, and thus the joint of the quick insert nozzle will be separately from the pipe connector easily, if an external force is applied to them, and such traditional quick insert nozzle has a major drawback that requires immediate solutions and improvements.

Since the pipe connector is connected to the quick insert nozzle, the embedding groove at an internal wall of the containing groove of the pipe connector is provided for embedding and limiting the balls at the joint of the quick insert nozzle, and the balls are installed in a ball bearing, not only incurring a higher cost, but also requires a higher level of difficulty for manufacturing the embedding groove onto the internal periphery of the containing groove of the pipe connector which also causes a higher cost. Therefore, the prior art requires further improvements.

SUMMARY OF THE INVENTION

In view of the foregoing shortcomings of the prior art quick insert nozzle for tools, the inventor of the present invention based on years of experience in the related industry to conduct extensive experiments and modifications, and finally invented a structure of a quick insert nozzle for tools, such that the structural design can combine the pipe connector with the quick insert nozzle in a simple and easy manner.

Another objective of the present invention is to provide a structural design for preventing the joint of the quick insert nozzle from being separated from the pipe connector easily.

A further objective of the present invention is to provide a structural design for giving a dustproof effect for the connection of the quick insert nozzle and the pipe connector, so as to prevent dusts entering into the quick insert nozzle or affecting the smooth turning of the quick insert nozzle.

To achieve the foregoing objectives, the structural design of the present invention comprises a containing groove disposed at an end of the pipe connector for connecting a joint of the quick insert nozzle, and the joint of the quick insert nozzle has three circular grooves, wherein the external circular groove installs a V-shape leakproof washer, and the middle circular groove is installed with a circle of balls, and the internal circular groove is provided for embedding a dust resisting cover, and the containing groove of the pipe connector is designed according to the diameter and type of the balls to match the joint of the quick insert nozzle for installing the V-shape leakproof washer and provide two sectional groove diameters. A wide groove diameter is engaged with a joint position of a narrow groove diameter as a design for the guiding cambered surface, and the wall thickness of the wide groove diameter is reduced to form a thin covering plate, such that after the joint of the quick insert nozzle is sheathed into the containing groove of the pipe connector, the thin covering plate of the pipe connector is stamped to form a limit position of the joint of the quick insert nozzle for embedding the balls, and finally the dust resisting cover is covered around the external edge of the thin covering plate, so as to provide a sealed dustproof effect for a gap formed at the connection of the pipe connector and the quick insert nozzle, and it completes assembling the structure of the quick insert nozzle.

DETAILED DESCRIPTION OF THE PREFERRED EMBODIMENTS

The structural assembly, technical measures, and functions of the present invention will become apparent in the following detailed description of the preferred embodiments with reference to the accompanying drawings.

Figure 3:
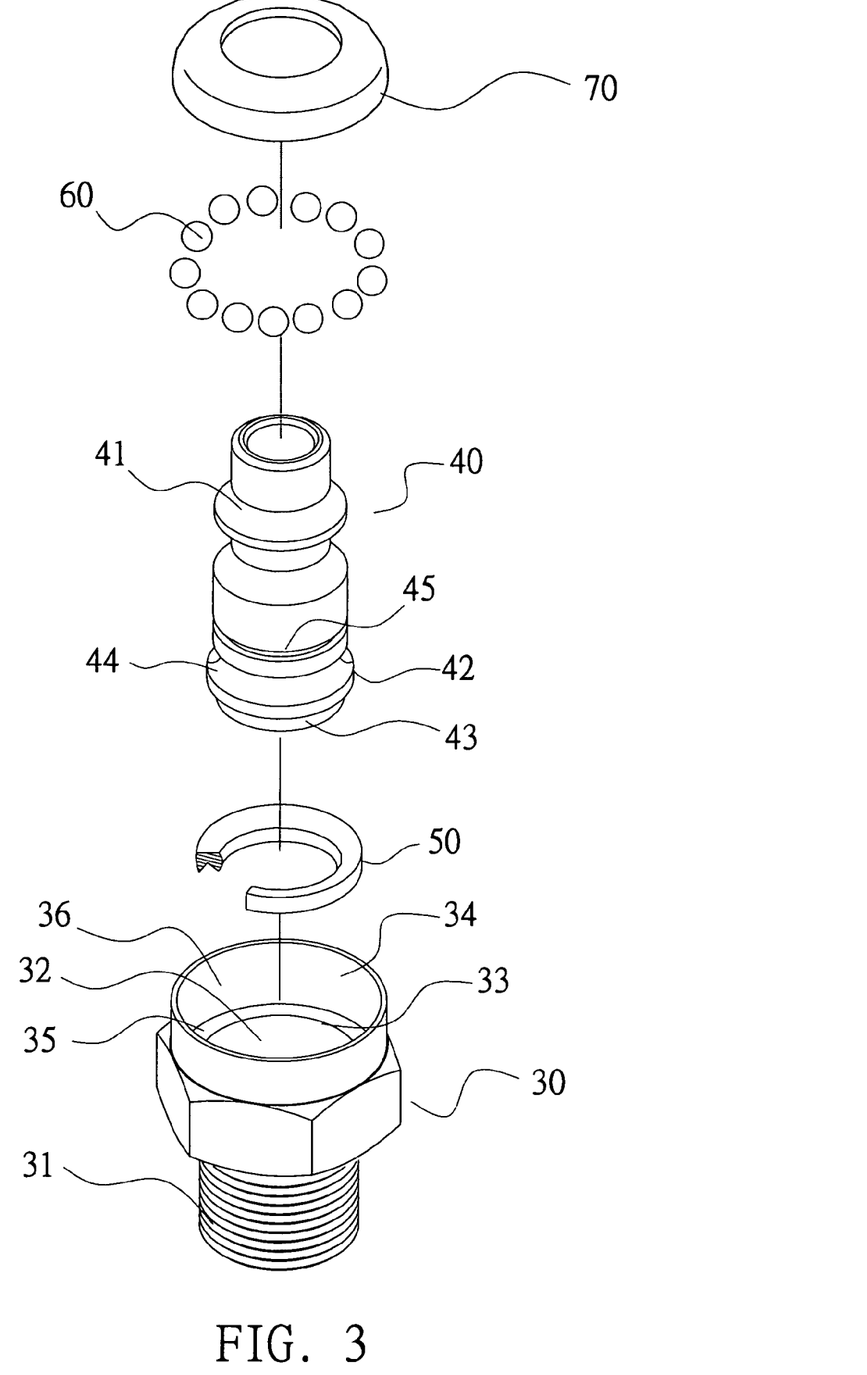
FIG. 3 is an exploded view of a preferred embodiment of the present invention.
Figure 4:
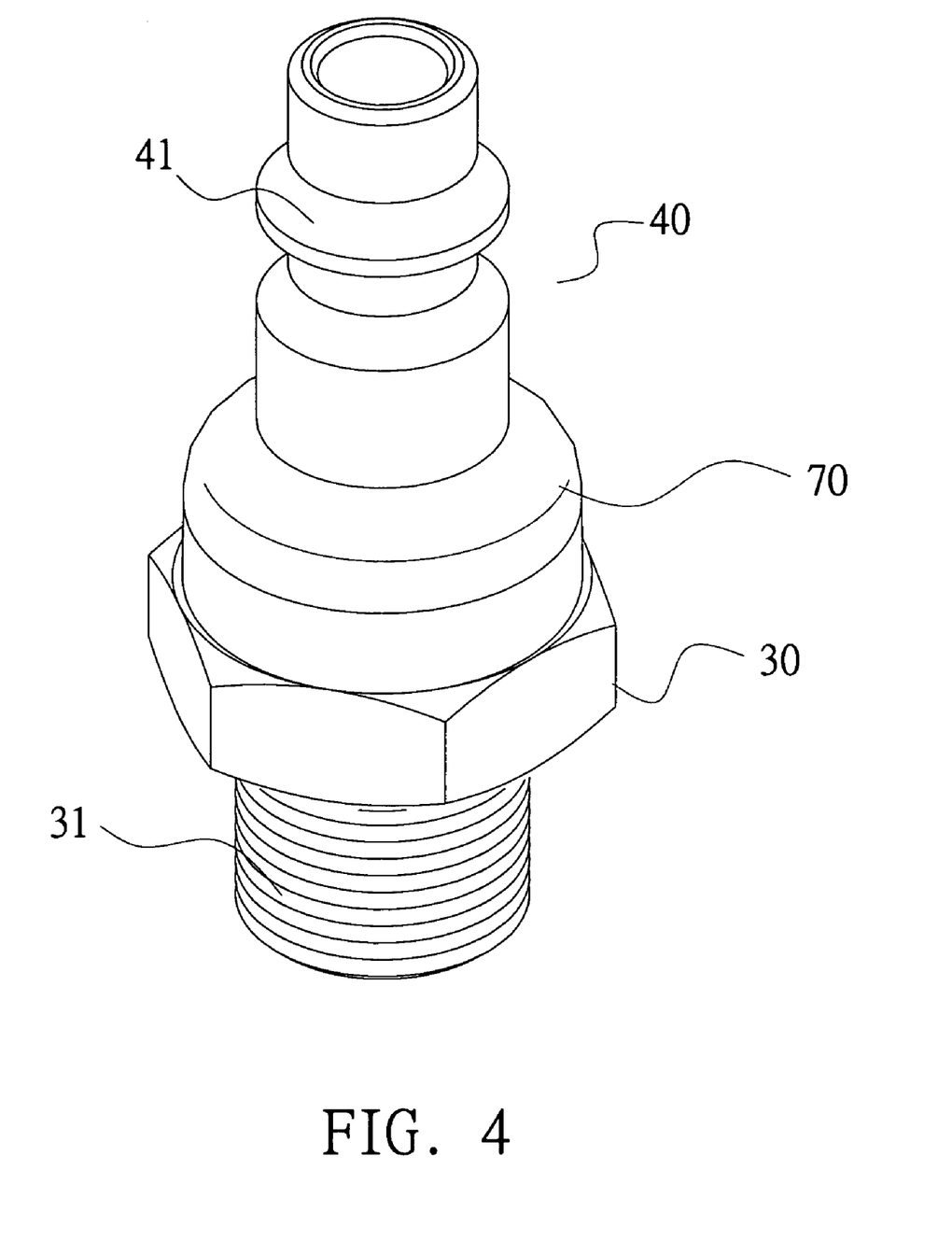
FIG. 4 is a schematic view of a preferred embodiment of the present invention.
Figure 5:
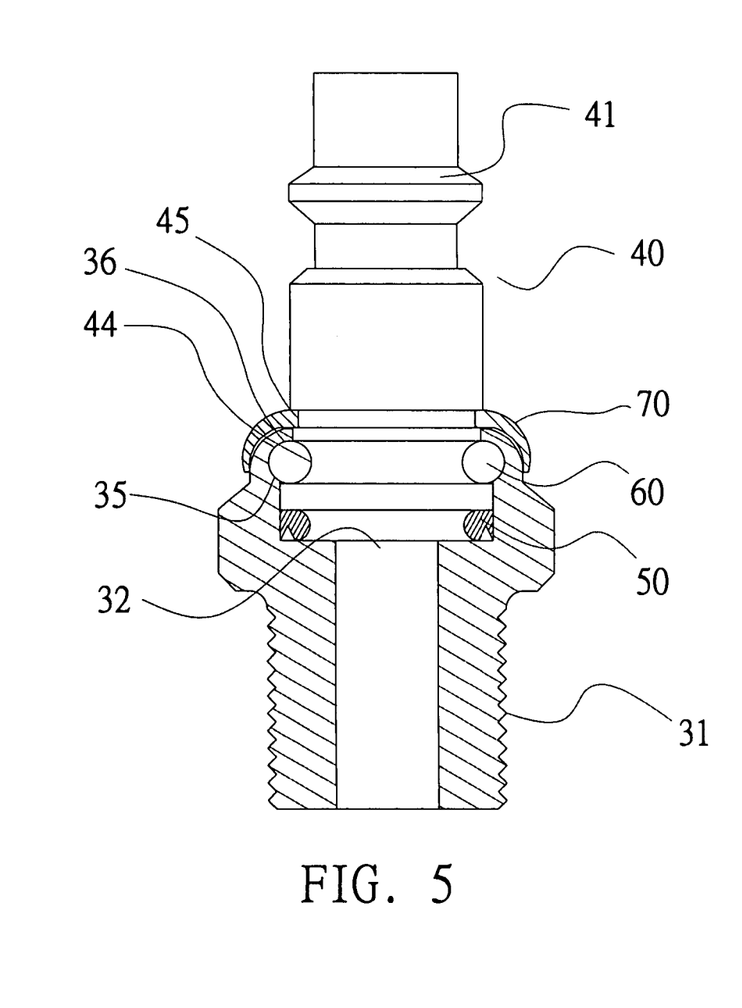
FIG. 5 is a schematic view of a structural relation of a preferred embodiment of the present invention.

Referring to FIGS. 3, 4 and 5 for an exploded view, a schematic view, a schematic structural view of a preferred embodiment of the present invention respectively, the structure of a quick insert nozzle for tools comprises a pipe connector 30 and a quick insert nozzle 40, wherein an end of the pipe connector 30 has a locking section 31 with an external thread for connecting a pipe, and another end of the pipe connector 30 has a containing groove 32 for installing a joint 42 of the quick insert nozzle 40, and another end of the quick insert nozzle 40 has an insert end 41 matching the type of a tool. The joint 42 has three circular grooves 43, 44, 45, wherein an external circular groove 43 installs a V-shape leakproof washer 50, and a V-shape opening of the V-shape leakproof washer 50 faces the internal end of the containing groove 32 of the pipe connector 30, and a middle circular groove 44 in the joint 42 embeds a plurality of balls 60 arranged in a circular shape, and an internal circular groove 45 embeds a dust resisting cover 70. A containing groove 32 of the pipe connector 30 matches with the diameter and type of balls 60 to be installed at the joint 42 of the quick insert nozzle 40 and the V-shape leakproof washer to provide two sectional groove diameters. A wide groove diameter 34 is coupled to the joint position of a narrow groove diameter 33 as a design for a guiding cambered surface 35, and the wall thickness of the wide groove diameter 34 is reduced to form a thin covering plate 36, such that after the joint 42 of the quick insert nozzle 40 is sheathed into the containing groove 32 of the pipe connector 30, the thin covering plate 36 of the pipe connector 30 is stamped to form a limit position of the joint 42 of the quick insert nozzle 40 for embedding the balls 60, and finally the dust resisting cover 70 is covered around the external edge of the thin covering plate 36, so as to provide a sealed dustproof effect for a gap formed at the connection of the pipe connector 30 and the quick insert nozzle 40 for preventing dusts and water scales from entering into the quick insert nozzle, and the foregoing procedure completes assembling the structure of the quick insert nozzle in accordance with a preferred embodiment of the present invention.

Figure 6:
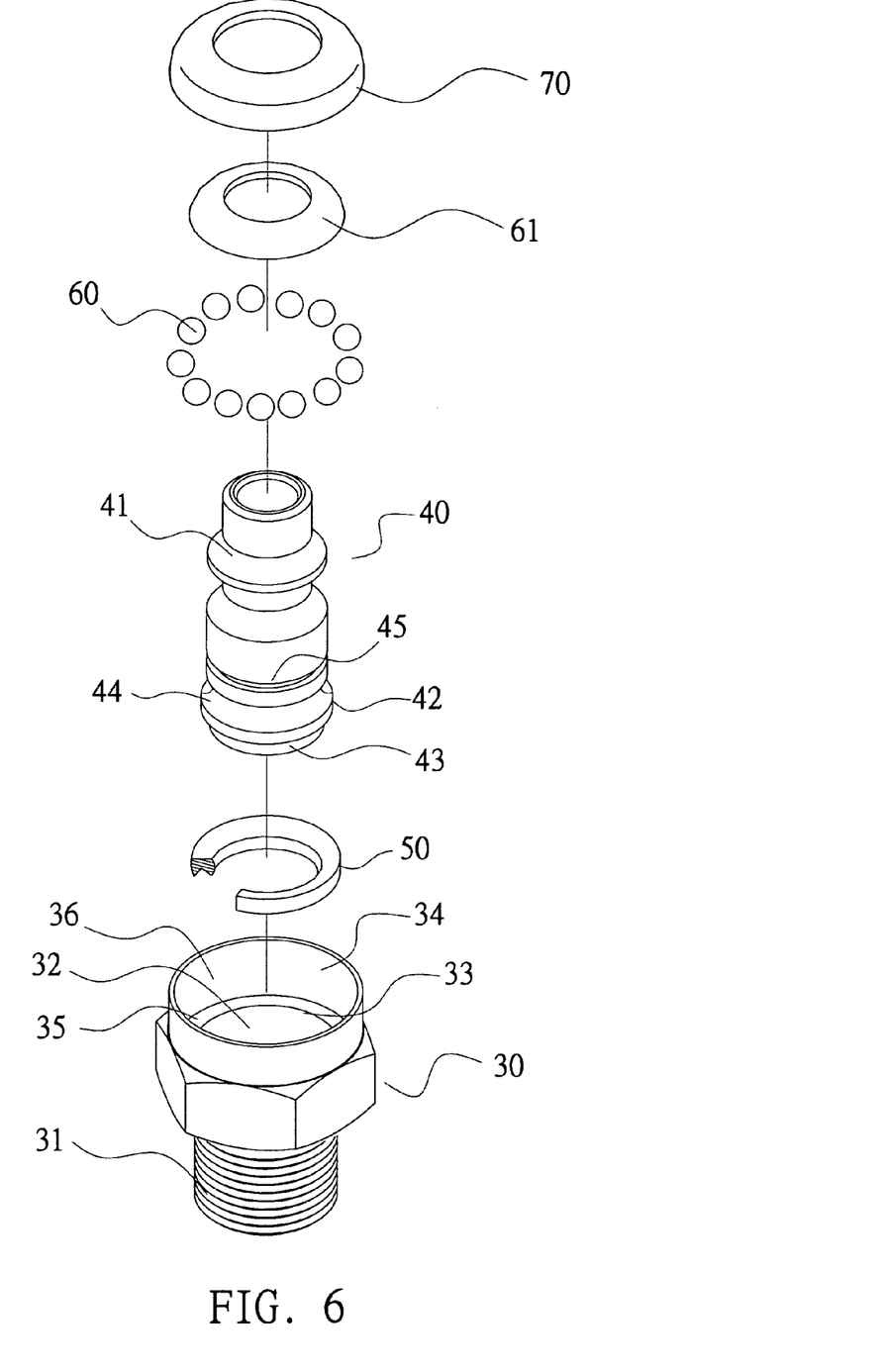
FIG. 6 is a schematic view of a structural relation of another preferred embodiment of the present invention.
Figure 7:
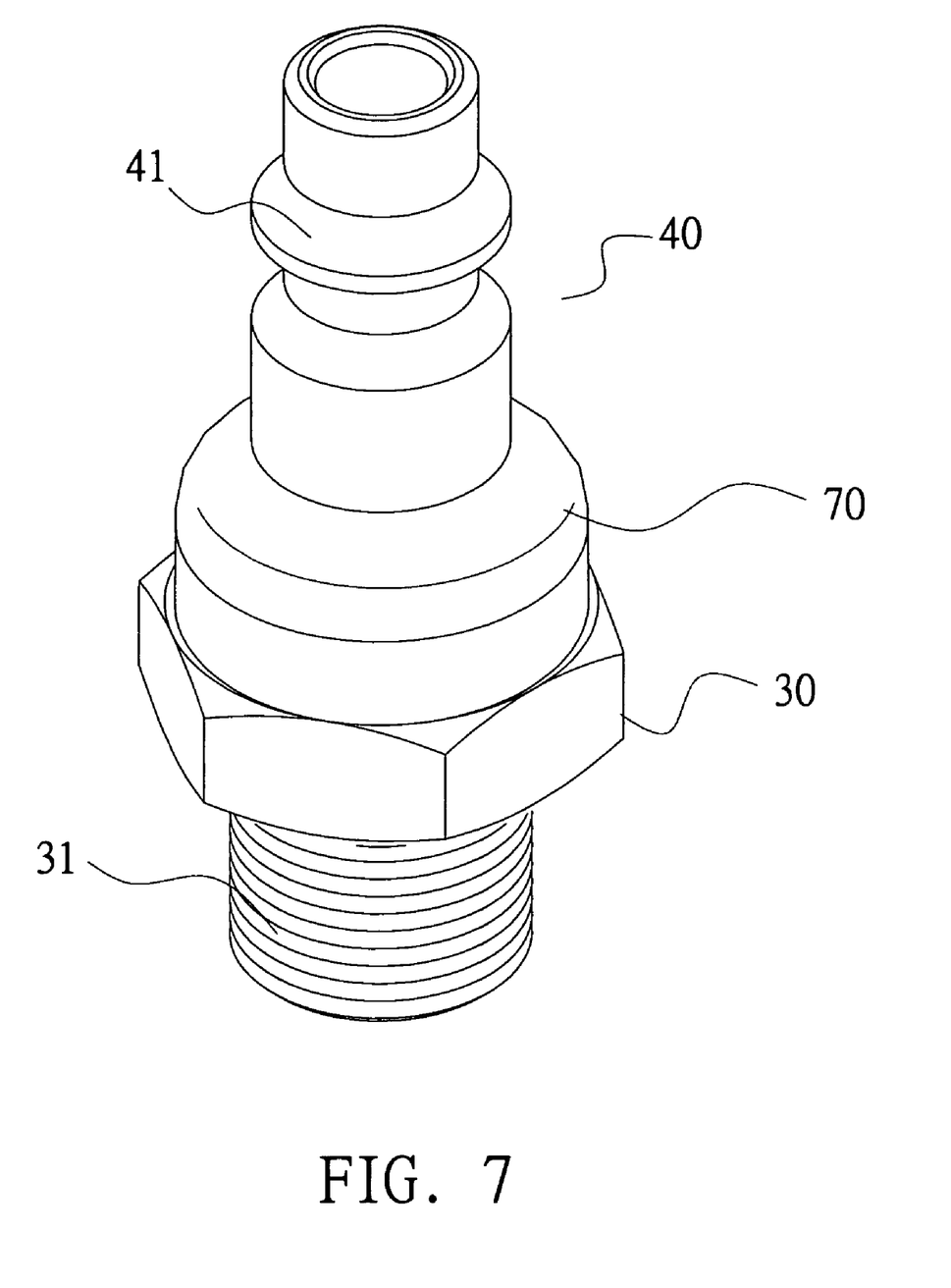
FIG. 7 is a schematic view of a structure of another preferred embodiment of the present invention.
Figure 8:
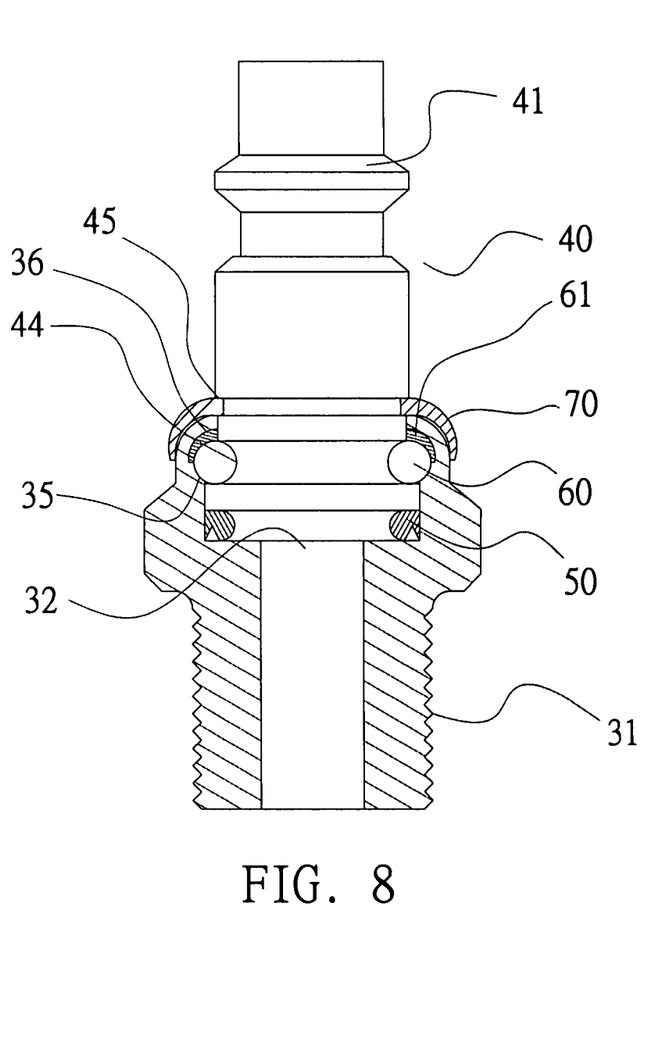
FIG. 8 is a schematic view of a structural relation of a further preferred embodiment of the present invention.

Referring to FIGS. 6 to 8 for an exploded view, a schematic view and a schematic structural view of another preferred embodiment of the present invention, a quick insert nozzle comprises a pipe connector 30 and a quick insert nozzle 40, wherein an end of the pipe connector 30 has a locking section 31 with an external thread for connecting a pipe, and another end of the pipe connector 30 has a containing groove 32 for installing a joint 42 of the quick insert nozzle 40, and another end of the quick insert nozzle 40 has an insert end 41 matching the type of a tool. The joint 42 has three circular grooves 43, 44, 45, wherein an external circular groove 43 installs a V-shape leakproof washer 50, and a V-shape opening of the V-shape leakproof washer 50 faces the internal end of the containing groove 32 of the pipe connector 30, and a middle circular groove 44 in the joint 42 embeds a plurality of balls 60 arranged in a circle, and the difference of this embodiment from the first embodiment resides on that a durable spacer 61 is added around the circle of balls for limiting the position of the balls 60 and prevent the balls 60 from being worn out, and an internal circular groove 45 of the joint 42 embeds a dust resisting cover 70. A containing groove 32 of the pipe connector 30 matches with the diameter and type of balls 60 to be installed at the joint 42 of the quick insert nozzle 40 and the V-shape leakproof washer to provide two sectional groove diameters. A wide groove diameter 34 is coupled to the joint position of a narrow groove diameter 33 as a design for a guiding cambered surface 35, and the wall thickness of the wide groove diameter 34 is reduced to form a thin covering plate 36, such that after the joint 42 of the quick insert nozzle 40 is sheathed into the containing groove 32 of the pipe connector 30, the thin covering plate 36 of the pipe connector 30 is stamped to form a limit position of the joint 42 of the quick insert nozzle 40 for embedding the balls 60 and installing the spacer 61, and finally the dust resisting cover 70 is covered around the external edge of the thin covering plate 36, so as to provide a sealed dustproof effect for a gap formed at the connection of the pipe connector 30 and the quick insert nozzle 40 for preventing dusts and water scales from entering into the quick insert nozzle, and the foregoing procedure completes assembling the structure of the quick insert nozzle in accordance with another preferred embodiment of the present invention.

In view of the structure described above, the pipe connector 30 and the quick insert nozzle 40 are assembled, such that the quick insert nozzle 40 is inserted directly into the containing groove 31 of the pipe connector 30, and then a stamping machine is used for the shaping. Such arrangement not only makes the manufacturing simpler and easier, but also prevents the quick insert nozzle 40 from being separated from the pipe connector 30 easily due to possible wearing of the balls, since the thin covering plate 36 is coupled directly with the balls 60 or the external edge of the spacer 61. Even if the balls are worn out, the invention still can maintain a normal operating function. In the meantime, the V-shape leakproof washer 60 allows fluids flowing in an opposition direction from the V-shape opening of the V-shape leakproof washer 50, so that the V-shape leakproof washer 50 can be connected securely with the containing groove 32 of the pipe connector 30 and the joint 42 of the quick insert nozzle 40, so as to achieve the sealed leakproof effect. The present invention can overcome the shortcomings and problems derived by similar traditional products.

In summation of the description above, the structure of the quick insert nozzle for tools in accordance with the present invention adopts the design of a containing groove at the joint of the quick insert nozzle for installing its pipe connector, and the design of the thin covering plate at the opening makes the connection of the pipe connector and quick insert nozzle easy by a stamping process, and thus the present invention can be used to substitute the complicated assembling process of similar traditional products and overcome all kinds of derived problems. Overall speaking, the present invention enhances over the prior art, and complies with the patent application requirements, and thus it is duly filed for patent application.

In summation of the description above, the structural design of the invention innovatively employs an improved quick insert quick to overcome the shortcomings of the prior art. Overall speaking, the invention is very useful to the industry and compliant with the cost-effective requirements, and further complies with the patent application requirements.

What is claimed is:

1. A quick insert nozzle for tools, comprising a pipe connector and a quick insert nozzle, wherein an end of said pipe connector has a locking section with an external thread for connecting a pipe, and another end of said pipe connector has a containing groove for receiving a joint of said quick insert nozzle, and another end of said quick insert nozzle has an insert end corresponding to an engaging tool, so as to constitute basic functional architecture of said quick insert nozzle for tools, characterized in that:

said joint of said quick insert nozzle has three circular grooves, wherein an external circular groove installs a leakproof washer, and a middle circular groove is filled up with a plurality of balls arranged in a circular shape, and an internal circular groove is provided for embedding a dust resisting cover, and said containing groove of said pipe connector corresponds to said leakproof washer and balls for engaging said joint of said quick insert nozzle joint to have two sectional groove diameters, and a wide groove diameter is coupled with a joint position of a narrow groove diameter to provide a design of a guiding cambered surface, and the wall thickness of said wide groove diameter is reduced to form a thin covering plate, such that after said joint of said quick insert nozzle is sheathed into said containing groove of said pipe connector, said thin covering plate of said pipe connector is stamped to form a limit position of said joint of said quick insert nozzle joint for embedding said balls, and finally said dust resisting cover is covered around the external edge of said thin covering plate, so as to provide a sealed effect for a gap formed at the connection of said pipe connector and said quick insert nozzle, and complete assembling the structure of said quick insert nozzle;

wherein said circular groove at said joint of said quick insert nozzle for filling said balls further installs a durable spacer for holding and limiting said balls and effectively preventing said balls from being worn out.

2. The quick insert nozzle for tools of claim 1, wherein said leakproof washer installed at said external circular groove of said joint of said quick insert nozzle is a V-shape leakproof washer, and a V-shape opening of said V-shape leakproof washer faces an inner end of said containing groove of said pipe connector to achieve the effect of sealing and preventing a possible leak.

3. A quick insert nozzle for a tool, comprising:

a pipe connector having a locking section at a first end thereof, the locking section being externally threaded for connecting with pipe, and having a containing groove at a second end thereof, the containing groove having a wide diameter groove, a narrow diameter groove, and a cambered surface between the wide and narrow diameter grooves, the wide diameter groove having a wall thickness that is less than a wall thickness of the narrow diameter groove; and a quick insert nozzle having a joint at a first end thereof, the joint being received in the containing groove to be engaged thereby, and having a second end that includes an insert end that is receivable within an engaging tool, said joint having three grooves, including first, second and third circular grooves, the first groove being closest of the three grooves to the first end of the nozzle, the third groove being furthest of the three grooves from the first end of the nozzle, the second groove being disposed between the first groove and the third groove;

a leakproof washer installed in the first groove;

a plurality of balls filling the second groove, so as to be arranged in a circular shape;

a durable spacer disposed in the second groove, for holding and limiting the balls and preventing the balls from being worn; and a dust resisting cover received in the third groove;

wherein the leakproof washer and the plurality of balls are received within the containing groove of the pipe connector to engage the joint with the containing groove;

wherein after the joint is sheathed into the containing groove, a wall defining the wide diameter groove is stamped to form a thin covering plate that embeds the plurality of balls in the containing groove; and wherein the dust resisting cover covers an external edge of the thin covering plate to seal a gap formed between the pipe connector and the quick insert nozzle.

* * * * *